Jan. 24, 1933.  A. E. FLOWERS  1,894,985

ADJUSTABLE CRANK

Filed April 13, 1928

WITNESS:
Robt R Kitchel

INVENTOR
Alan E. Flowers
BY
Busser and Harding
ATTORNEYS.

Patented Jan. 24, 1933

1,894,985

UNITED STATES PATENT OFFICE

ALAN E. FLOWERS, OF POUGHKEEPSIE, NEW YORK, ASSIGNOR TO THE DE LAVAL SEPARATOR COMPANY, OF NEW YORK, N. Y., A CORPORATION OF NEW JERSEY

ADJUSTABLE CRANK

Application filed April 13, 1928. Serial No. 269,645.

In many machines operated by manual power, of which cream separators are one class, there is a large inertia making the start hard and yet after reaching full speed these machines run with little power. If a long crank is used it is much less than with a short one, but after reaching full speed the exertion of moving the body to swing the large circle is more tiring than the work needed to drive the machine.

It is known to provide a construction wherein the effective length of the crank arm may be readily changed to fit either of the conditions specified. Such known constructions also permit the change of length to be effected without stopping the machine, hold the crank arm in its adjusted position, and release the holding means when the application of power to the crank arm ceases. See the patents to Leitch and Hall, No. 1,159,054, and to Turner, No. 1,215,747.

The object of the present invention is to provide a new and improved construction that accomplishes the foregoing and other objects. In the patents specified, the said adjustments were effected by a novel connection between the crank arm and the driven shaft. In my invention the said adjustments are effected by a novel connection between the crank arm and the crank handle. My invention has certain advantages over the old construction. In my invention the ordinary connection between the crank arm and the driven shaft may be retained, the structural changes being confined to a new mode of applying the handle to an old crank arm and shaft. The invention has the further advantage that the automatic adjustment of effective length of crank may be effected during a small fraction of a complete rotation of the driven shaft, this accomplishing a very quick adjustment.

In the drawing, which illustrates one of different possible embodiments of the invention—

The crank shaft $a$ has secured thereto a ratchet collar $b$ and has sleeved thereon a ratchet hub $c$ carrying a crank arm $f$. A screw $d$ carried by the hub $c$ extends into an annular groove $e$ in the shaft and prevents the hub slipping off the shaft. The described construction, which is well known, permits the shaft to be driven by the crank arm when the latter is turned in one direction and allows the shaft to continue to turn by momentum when the application of turning power to crank arm ceases and while the crank arm is held from rotation with the shaft.

The opposite or free end of the crcank arm $f$ carries a hub $g$ in which is turnable, on an axis parallel to shaft $a$, a stud $i$. At one end the stud carries a disc $j$ and at the other end an eccentric $h$. The hub $g$ thus extends between disc $j$ and eccentric $h$, but the fit is not so close as to obstruct the free turning of stud $i$, disc $j$ and eccentric $h$ relatively to hub $g$.

Secured to the eccentric $h$ at one side of its axis of rotation, and preferably to a radially extending boss $h'$, is a handle. The handle may comprise a rod $k$ threaded into the eccentric and carrying at its other end a head $k'$ between which and the eccentric is a sleeve $m$ adapted to be grasped by the hand of the operator. A lock nut $n$ secures rod $k$ to the eccentric and allows free turning of sleeve $m$ on rod $k$.

Opening in that face of hub $g$ adjacent to eccentric $h$ is a groove $o$ extending through an arc of about 180°. This groove extends part way around stud $i$ and on that side of the stud nearest the axis of rotation of the crank arm. Projecting from that face of eccentric h adjoining hub g is a pin p, which extends into the groove o.

Figure 1:
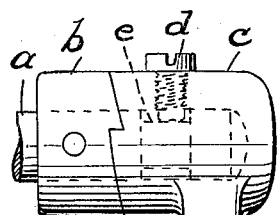
Fig. 1 is an elevation of the crank arm and its connections with the driven shaft and handle, the latter being adjusted to provide a long effective crank arm.
Figure 4:
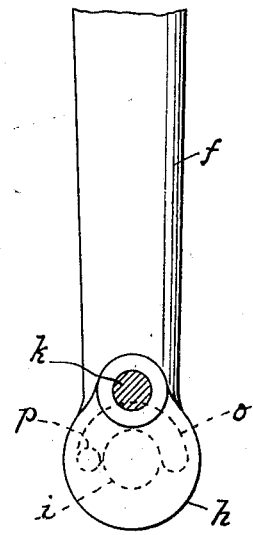
Fig. 4 is a section on the line 4—4 of Fig. 2, looking toward the left.
Figure 2:
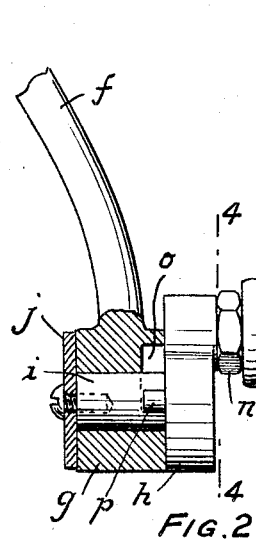
Fig. 2 is a similar view, partly in section, of the connections between the crank arm and handle, the latter being adjusted to provide a short effective crank arm.
Figure 3:
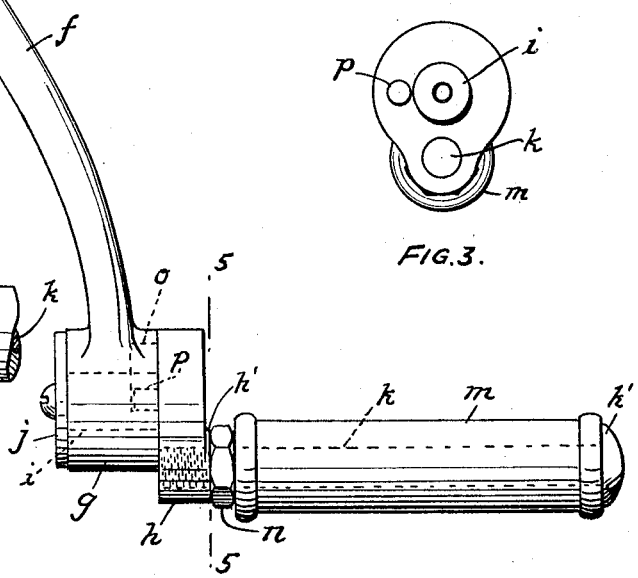
Fig. 3 is an end view of the turnable handle-carrying member, looking toward the right, Fig. 1.

From the foregoing description it will be understood that, by means of the handle m, the eccentric h may be turned either into the position shown in Fig. 2, at which the axis of the handle is relatively near the axis of shaft a, or into the position shown in Fig. 1, in which the axis of the handle is relatively distant from the axis of shaft a.

Whether the handle is in one position or the other, the pin p bears against one or the other end of groove o. In either position of the handle the driving power of the handle is transmitted to the crank arm f through the pressure of pin p against one or the other end wall of groove o. In either position of the handle the thrust required to turn the crank arm is one that holds the handle in the position to which it has been adjusted.

Figure 5:
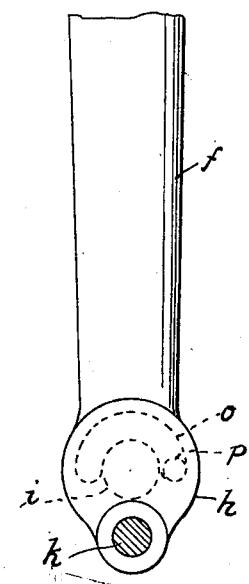
Fig. 5 is a section on the line 5—5 of Fig. 1, looking toward the left.

In starting, the handle will be adjusted to the position shown in Figs. 1 and 5, which provides a relatively long crank arm whose effective length is measured by the distance between the axes of shaft a and handle m. The thrust of the handle required to turn the crank arm maintains the pin p in the end of the groove o which it must occupy to maintain a long crank arm. After the desired speed has been reached, the operator either holds the handle stationary or retracts it while the shaft a continues to rotate under its acquired momentum. This causes the eccentric to turn relatively to hub g, which causes the pin p to travel through the groove o from one end to the other until further movement of the pin is arrested by its engagement with the opposite end wall of the groove o. This adjustment of the handle may be made during a small fraction of a revolution of shaft a. Thereby the distance between the axes of shaft a and handle m is substantially shortened, providing, in effect, a relatively short crank arm. The application of power to the handle may now be resumed, the thrust required to turn the crank arm maintaining the pin in the last named end of the groove. If it is desired to again lengthen the effective crank arm length, the handle may be, in the way described, readjusted to its initial position.

Having now fully described my invention, what I claim and desire to protect by Letters Patent is:

1. An adjustable crank arm construction comprising a crank arm, a hub thereon, a second hub turnable on the first hub and a handle secured to the second hub at one side of the axis on which the second hub is turnable, and a pin and arcuate groove connection between the two hubs adapted to limit the turning movement of one hub relative to the other.

2. An adjustable crank arm construction comprising a crank arm, a hub thereon, a second hub turnable on the first hub and a handle secured to the second hub at one side of the axis on which the second hub is turnable, and a pin and arcuate groove connection between the two hubs adapted to limit the turning movement of one hub relative to the other, said groove being so positioned relative to the handle that the travel of the pin from one end to the other end of the groove shifts the axis of the handle from a position between the axis of rotation of the crank arm and the axis of the second hub to a position in which the axis of rotation of the second hub is between the axis of rotation of the crank arm and the axis of the handle.

3. An adjustable crank construction comprising a shaft, a crank arm, a handle mounted adjustably on the crank arm to vary the effective length of the crank arm while the crank arm is turning, said handle being operable to turn the crank arm in the same direction in either adjusted position, and means to lock the handle in the position to which it is adjusted while the application to the handle of turning power in the same direction continues.

4. An adjustable crank construction comprising a shaft, a crank arm, a handle, and means to adjust the handle relative to the crank arm while the latter is turning to vary the effective length of the crank arm, said means being rendered operative, during the rotation of the crank arm on the shaft, upon cessation of application of turning power to the handle, and interlocking means operative, upon resumption of turning power to the handle in the same direction, to lock the handle to the crank arm in its adjusted position.

5. An adjustable crank construction comprising a shaft, a crank arm, a handle mounted adjustably on the crank arm to vary the effective length of the crank arm, and means to lock the handle in the position to which it is adjusted while the application of turning power to the handle continues and to unlock the handle and effect its readjustment upon cessation of application of turning power to the handle but while the shaft continues to turn in the same direction.

6. An adjustable crank construction comprising a crank arm and a handle bodily rotatable relative to the arm about a center eccentric to the handle into positions adapted to vary the effective length of the crank arm while the latter is turning, and means to lock the handle to the crank arm in the position to which it is adjusted while the crank arm continues to turn in the same direction.

7. An adjustable crank arm construction comprising a crank arm, a handle, and connections between the crank arm and handle allowing bodily rotation of the handle about a center eccentric to the handle to bring the handle into two positions, one relatively near to, and the other relatively far from, the axis of rotation of the crank arm, said connection including means to lock the handle in either position while the application of turning power thereto in the same direction continues and to unlock the handle and allow its readjustment to its opposite position when the application of turning power to the handle ceases and while the crank arm continues to turn in the same direction.

In testimony of which invention, I have hereunto set my hand, at Poughkeepsie, N. Y., on this twenty-eighth day of March, 1928.

ALAN E. FLOWERS.